US010726471B2

(12) United States Patent
Avgiris et al.

(10) Patent No.: US 10,726,471 B2
(45) Date of Patent: Jul. 28, 2020

(54) SALES AND INTERACTION PLATFORM

(71) Applicant: Comcast Cable Communications, LLC, Philadelphia, PA (US)

(72) Inventors: Catherine Avgiris, Ambler, PA (US); Amy Stipandic, Philadelphia, PA (US); Kevin Rhatigan, Ontario, NY (US); Kevin O'Brien, Ashburn, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/494,023

(22) Filed: Sep. 23, 2014

(65) Prior Publication Data
US 2016/0086252 A1 Mar. 24, 2016

(51) Int. Cl.
*G06Q 30/06* (2012.01)
*H04L 29/08* (2006.01)

(52) U.S. Cl.
CPC ......... *G06Q 30/0633* (2013.01); *G06Q 30/06* (2013.01); *H04L 67/16* (2013.01)

(58) Field of Classification Search
CPC . G06Q 30/0633; G06Q 30/0601–0645; G06Q 30/06–08; H04L 61/1541; H04L 67/16
USPC ................................................ 705/26.1–27.2
See application file for complete search history.

(56) References Cited

U.S. PATENT DOCUMENTS

| | | | | |
|---|---|---|---|---|
| 8,060,555 B2 * | 11/2011 | Grayson | ................ | G06Q 10/06 709/203 |
| 9,112,621 B1 * | 8/2015 | Mishra | ................... | H04H 40/18 |
| 2002/0019699 A1 * | 2/2002 | McCarty | ........... | G06F 17/30241 701/431 |
| 2002/0059142 A1 * | 5/2002 | Krause | ................... | G06Q 10/10 705/44 |
| 2002/0116721 A1 * | 8/2002 | Dobes | ................. | H04L 12/2856 725/129 |
| 2005/0234911 A1 * | 10/2005 | Hess | ...................... | G06Q 10/08 |
| 2008/0262897 A1 * | 10/2008 | Howarter | ............... | G06Q 30/00 705/7.34 |
| 2011/0137745 A1 * | 6/2011 | Goad | .................. | G06F 17/3087 705/26.9 |

(Continued)

OTHER PUBLICATIONS

"New-build homeowners struggle to move services" The Guardian, http://www.theguardian.com/money/2010/sep/24/new-build-home-move-services.*

(Continued)

*Primary Examiner* — Ming Shui
(74) *Attorney, Agent, or Firm* — Banner & Witcoff, Ltd.

(57) ABSTRACT

A system may include a platform for an application to support processing flows for a service provider, such as ordering, sales, support, service delivery, and related process flows. The system may provide a limited set of application programming interfaces (APIs) that map to an application's user-experience page flows. The APIs may always appear to the application that the interaction process completed successfully—even if human intervention is required—to allow the application to complete the transaction. The system may have the ability to recognize the same user, and leverage that user's behavior across interactions with multiple sales channels. The system may thus provide, in one aspect, an enhanced user experience for ordering and maintaining complex service and equipment offerings.

19 Claims, 10 Drawing Sheets

(56) References Cited

U.S. PATENT DOCUMENTS

2013/0346130 A1* 12/2013 Davis ............... G06Q 10/06311
                                                      705/7.14
2014/0297176 A1* 10/2014 Armato ............. G01C 21/3605
                                                       701/445

OTHER PUBLICATIONS

AtlDad (Oct. 24, 2009). Re: New street, not recognized by anyone [online discussion group] retrieved from: http://www.city-data.com/forum/house/798498-new-street-not-recognized-anyone.html.*

* cited by examiner

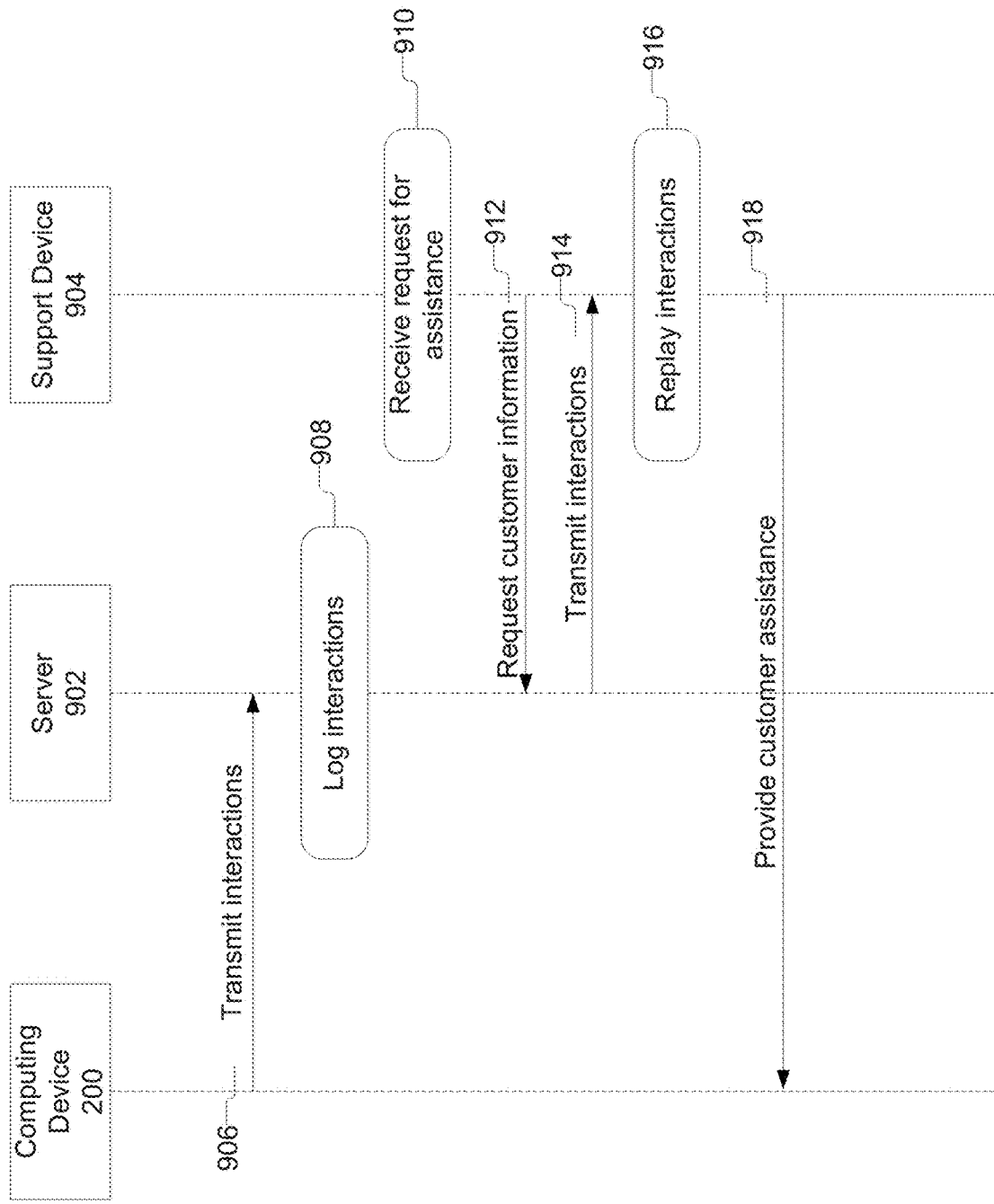

SALES AND INTERACTION PLATFORM

BACKGROUND

Lives revolve around connections. People are connected to each other through email, social networks, messaging systems, photo-sharing services, and more. By sharing content, people learn more about each other and the world around them. Those connections are made possible by the nearly infinite number of wires and devices crisscrossing the globe that form networks. Service providers, which provide people with access to those networks, seek to connect people to content. Thus, there will always be a need for improved ways for service providers to interact with people seeking to connect to networks.

SUMMARY

The following summary is for illustrative purposes only, and is not intended to limit or constrain the detailed description.

A system may provide a business process management platform that may manage the browse, shop-to-order, and pay process steps associated with individual or bundled complex service and equipment offerings (e.g., wired or wireless services for content, data, etc.). The system may support a set of post-engagement, e.g., post-sale, processes such as adding equipment, managing lead-to-orders, and query-order statuses.

A system may provide a flexible, business-driven platform that may provide a consistent customer experience across a plurality of communication channels for the shopping, ordering, and configuring of complex products and offerings. For example, a provider may use a system implementing some of the features described herein to power a user environment and provide a scalable platform to support near-future products and entertainment experiences on the horizon.

A system may support residential, business, or other users or customers, including prospective and existing customers. Residential customers may include single family, apartment, condo, townhome, or other units. Business customers may include small or large entities, regardless of structure. Customers may be individual customers or part of a bulk-customer agreement (e.g., a multi-dwelling unit, a home-owner's association, property-owner-tenant arrangement).

A system may include many benefits, including simplified end-to-end customer experience for ordering and configuring complex offers and products. Another benefit may include sales automation from lead to order to activation, eliminating the risk and cost of manual order entry. Another benefit may include real-time access to customer or order intelligence that may assist with business decisions. Another benefit may include consistently applied business rules and policies.

In some embodiments, the system may receive a request to initiate service at a new address. The new address may not be in a database of serviceable addresses. The system may determine that the database of serviceable addresses includes a nearby address within a threshold distance (e.g., one block, two blocks, one mile, etc.) of the new address, and initiate a service request to provide service to the requested address.

In some embodiments, the system may initiate a move process for an existing user at an address in response to receiving a request from another user to initiate service at the address. The system may receive the request to initiate service for the different user at the address, and determine that the address currently has the service for the existing user.

In some embodiments, the system may receive a request for assistance from a customer attempting to interact with an application, and re-create, e.g., replay, in response to receiving the request for assistance, a plurality of interactions by the customer with the application, the plurality of interactions preceding the request for assistance.

In some embodiments, the system may perform a method including receiving a request to add an item to an online shopping cart associated with a shopping session on a shopping channel, detecting abandonment by a user of the shopping session associated with the online shopping cart, receiving a request from the user to initiate a different shopping session on a different shopping channel, and retrieving the online shopping cart associated with the shopping session on the shopping channel for use with the different shopping session on the different shopping channel. In one embodiment, the shopping channel may include a website, and the different shopping channel may include telesales. In one embodiment, the item may include a complex service and equipment offering, such as cable or internet service.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

FIG. 9 illustrates an example process flow for implementing various features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
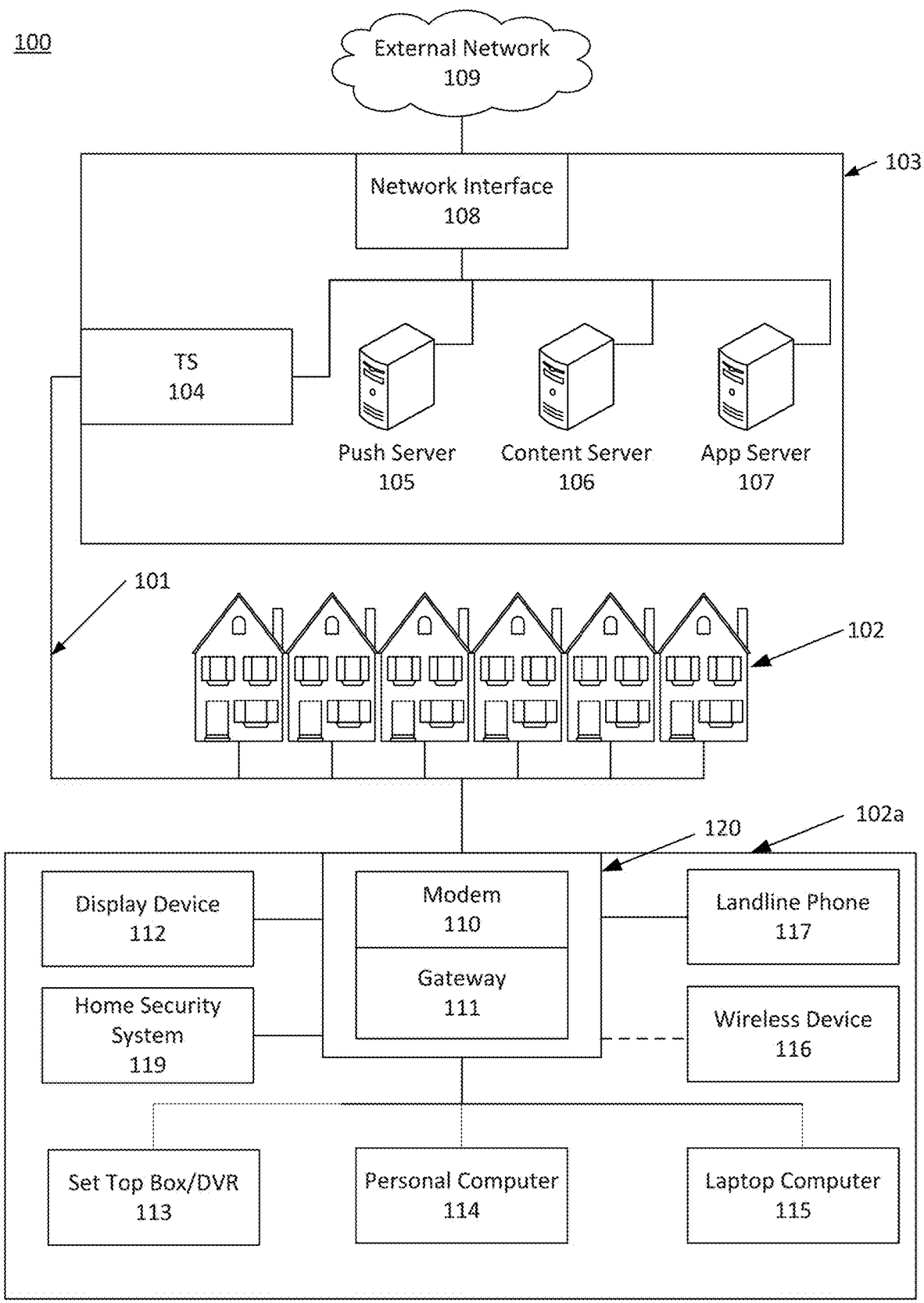
FIG. 1 illustrates an example communication network on which various features described herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
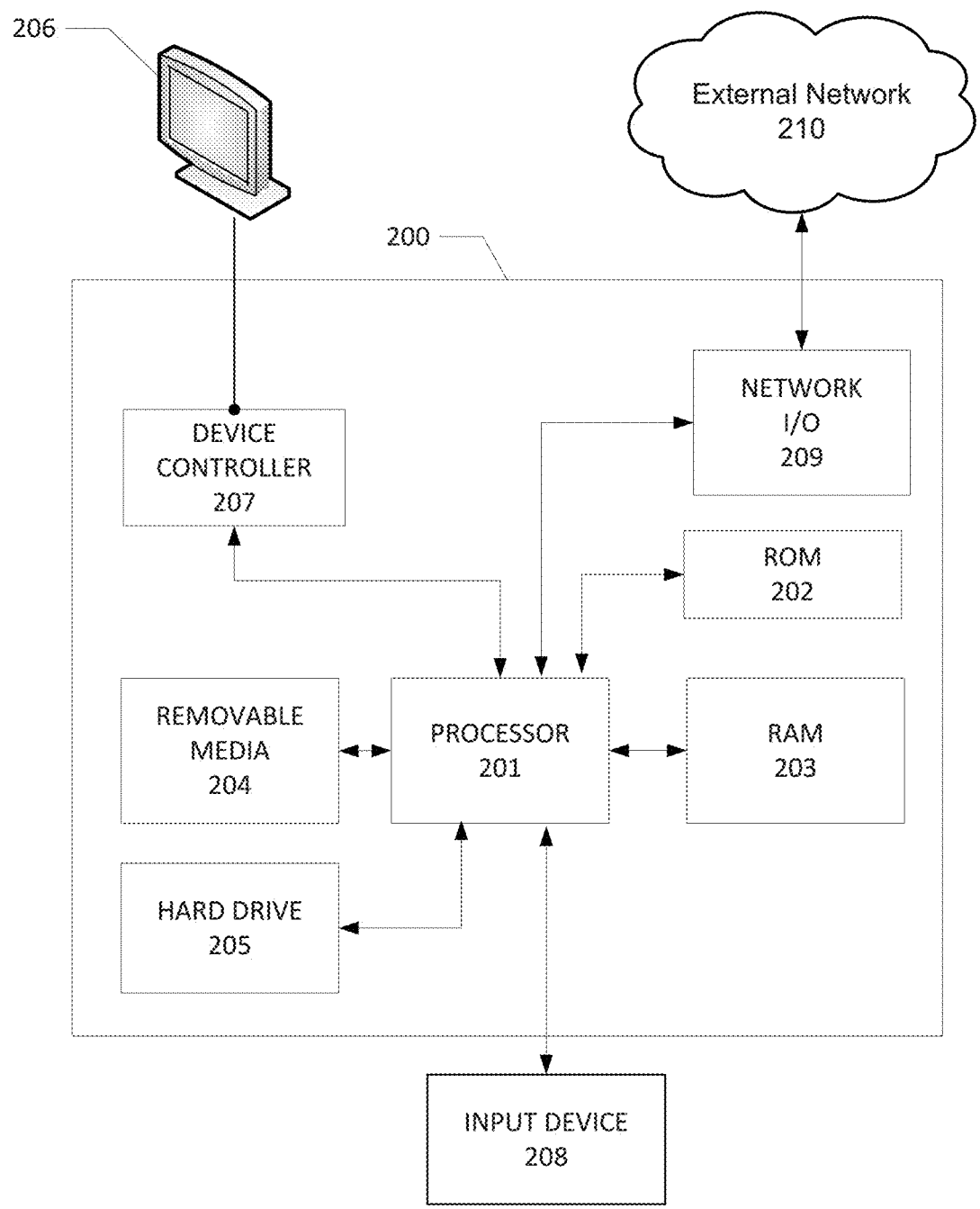
FIG. 2 illustrates an example computing device that may be used to implement various features described herein.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images and/or video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include security system application data 201*a* which may enable the device to perform the steps described herein.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Having discussed an example network environment and computing device, discussion will now turn to FIG. 3, which illustrates example devices with which various features described herein may be performed and implemented.

Figure 3A:
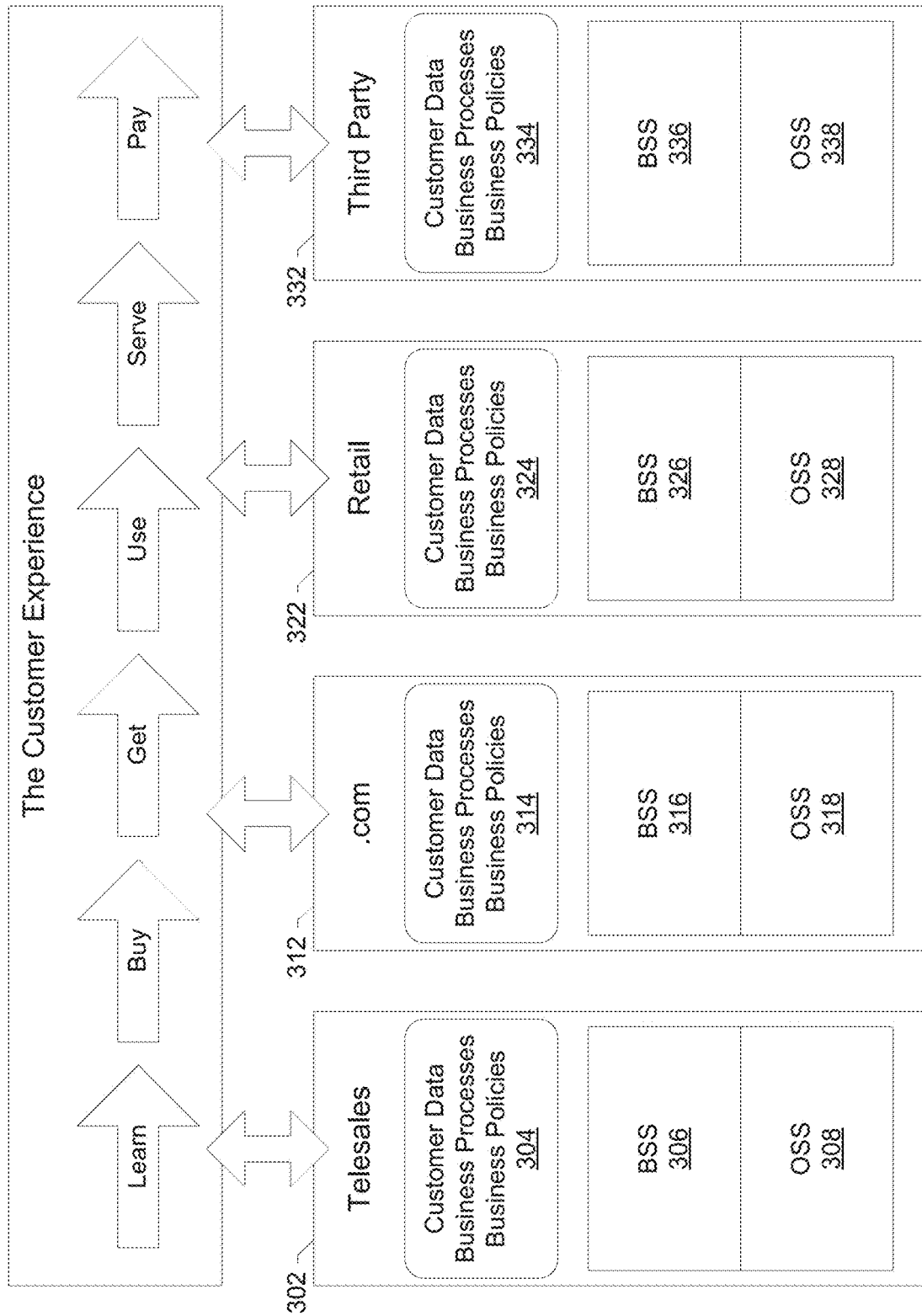
FIGS. 3A-3B illustrate an example flow diagram of a series of interactions between a customer and a number of different sales channels.
Figure 3B:
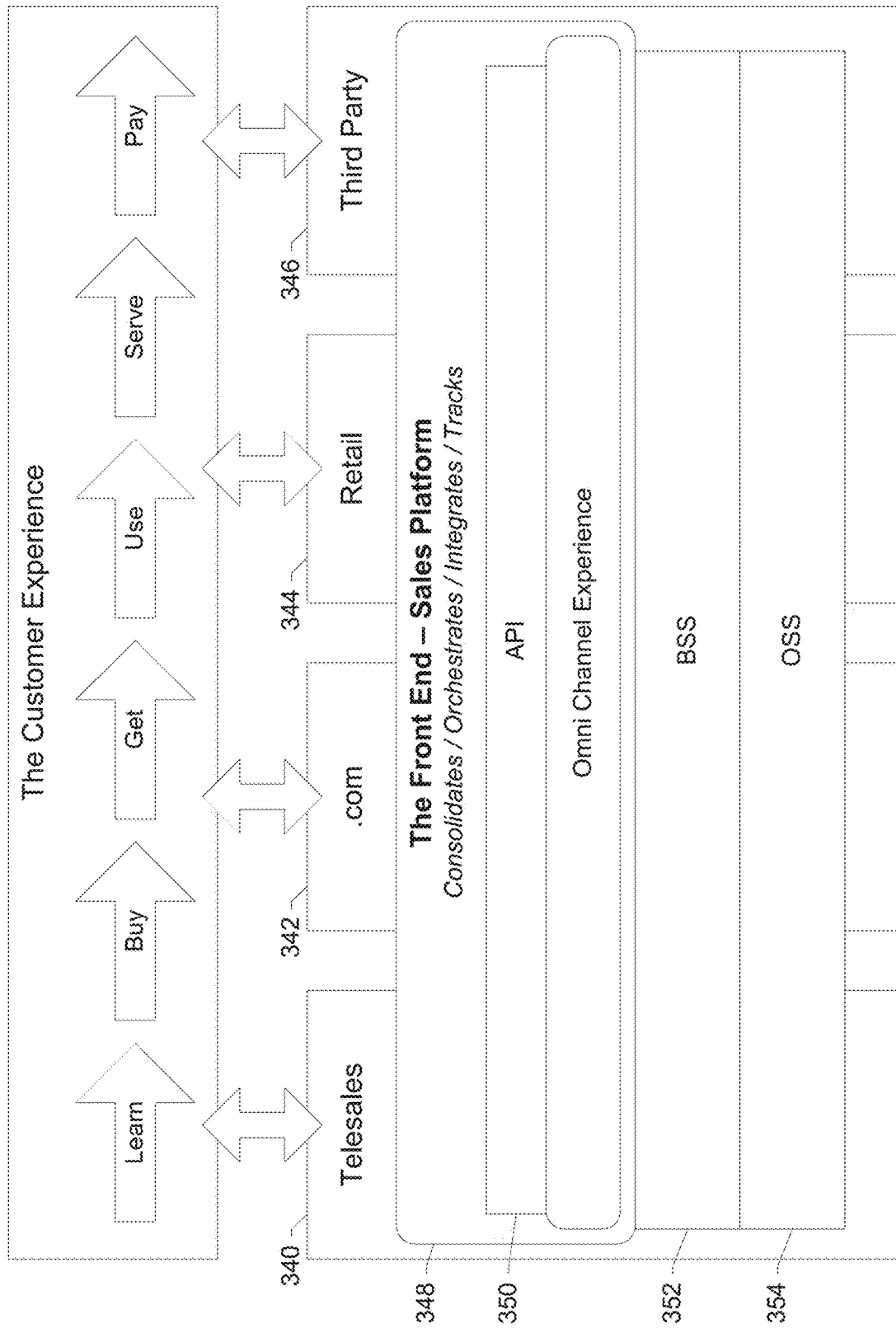

FIGS. 3A and 3B show system flow diagrams of illustrative embodiments of systems for communicating between a service provider and a customer. FIG. 3A shows an illustrative embodiment of one system for communicating with a customer through multiple different sales channels. FIG. 3B shows an illustrative embodiment of another system for communicating with a customer over different sales channels integrated by a single sales platform.

As illustrated in FIG. 3A, the user or customer experience may include communicating or interacting with a company (e.g., a service provider, a content source, etc.) in multiple ways. The customer may learn, buy, get, use, be served, and pay, for example. Each interaction will be discussed below.

A customer may learn about different products offered by a company. The customer may learn about company products by browsing a website, talking to a company sales representative, viewing or listening to an advertisement, reading product literature (e.g., mailings), visiting a retail location, or otherwise interacting with a company, its representative, or reading about its products, to learn more about the company's products. A company may be an aggregation of multiple companies, offering many different (e.g., unrelated) products and services.

A customer may buy one or more products in many different ways. The customer may buy products through telesales (e.g., phone marketing), a company website, a retail location, or a third party (e.g., door-to-door sales, third-party website).

A customer may get a company product or service in different ways. For example, a cable customer (e.g., coaxial cable, fiber-optic cable) may receive installation from a cable-company installer, a third-party installer, or otherwise. A company may mail or otherwise deliver products to a customer. There may be a combination of ways that a customer receives service (e.g., a company mails equipment to a customer's house or business, and sends a technician to complete an installation of a product or service).

A customer may use a company product or service. For example, a customer may use a network-connection (e.g., Internet) service by connecting the customer's devices (e.g., computer, laptop, tablet, smartphone) to a network that is connected to the Internet over a connection provided by a company. The customer may watch or listen to television, on-demand video, movies, radio, access data, or other content made available over a company's content-distribution network. The customer may use more than one products or services offered by a company (e.g., bundle packages, Internet, television, cable, home security).

A customer may receive service from a company. A company may visit the home or business of a customer to perform the initial setup and installation of a new product or service, as described above. The company may visit the home or business of the customer to perform service, upgrades, maintenance, or otherwise continue to serve the customer. The company may offer phone, internet, web, video, chat, email, or other support to a customer.

The customer may pay for products or services received from a company. The customer may pay manually each month using cash, check, credit card, charge card, direct-transfer (e.g., automated-clearing house (ACH) transfer), or another form of payment. The customer may receive bills through the mail, online, over the phone, etc. The customer manage an account online, over the phone, through the mail, etc. The customer may pay on a payment plan (e.g., pay the same amount every month for a variable-cost service, the variable-cost service averaged over the course of the year to result in a standardized monthly-payment amount).

The customer may communicate or interact with a company through multiple different methods or sales channels. For example, the customer may interact with the company through the telephone (e.g., telesales), a website (e.g., company website), an application, retail location, or a third party (e.g., third-party vendor, website, salesperson).

In the embodiment illustrated in FIG. 3A, each sales channel (e.g., sales channel 302, 312, 322, 332) may maintain its own customer data, business processes, and business policies (e.g., customer data, business processes, and business policies 304, 314, 324, 334). Each sales channel may maintain its own business support system (BSS) (e.g., BSS 306, 316, 326, 336) and operational support system (OSS) (e.g., OSS 308, 318, 328, 338).

In some embodiments, one sales channel may not communicate or share information with another sales channel. For example, if a service provider offers a promotion on a service, the business processes, business policies, BSS data, and OSS data may be individually created for the promotion on each sales channel.

FIG. 3B shows an illustrative embodiment of a system that integrates the platform used by a company (e.g., service provider) for interacting with a company. In the illustrated embodiment, each different sales channel (e.g., telesales 340, website 342, retail 344, and third party 346) may integrate with or tie into a single front end (e.g., front end 348). For example, each sales channel may interface with an application programming interface (API) (e.g., API 350), that offers a unified method for accessing customer data, business processes, and business policies. The single front end may communicate with a single BSS (e.g., BSS 352) and OSS (e.g., OSS 354). Thus, for example, if a service provider offers a promotion on a service, the business processes, business policies, BSS data, and OSS data may be created once, and used or accessed to offer the promotion on each sales channel.

Figure 4:
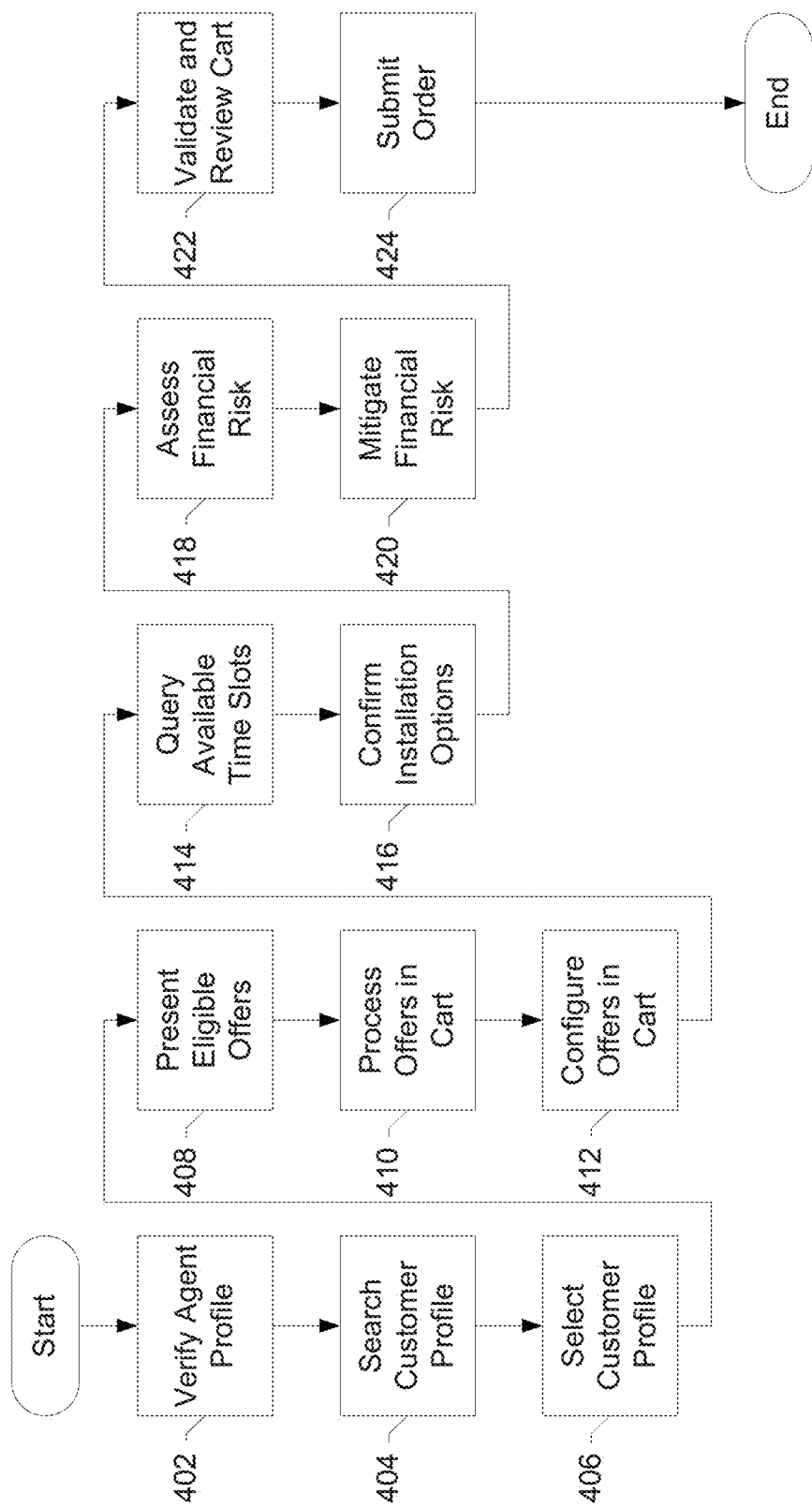
FIG. 4 illustrates an example process flow for implementing various features described herein.

FIG. 4 shows an illustrative flow diagram for lead-to-order process management (e.g., implemented in an API). System integration with a client-side sales application may be through a series of interrelated APIs. A flow across these APIs may be expected, but some variations may be normal and expected as well. To simplify the problem of standardizing the flow, the system's API interface may return error codes, guidance (e.g., which API may be invoked next), or other information to help a client-side user, developer, or programmer to navigate the interaction flow with the system. One illustrative process by which an application may interact with the API to assist a customer to order a product or service from a company is described below.

In step 402, a system (e.g., computing device 100) may verify an agent profile. An agent may be a device or individual (e.g., user, employee, salesperson) interacting with the system through a particular sales channel. For example, an agent may include a server operating a website, an application (e.g., smartphone or tablet application), a sales kiosk or register at a retail sales location, a device used by a sales agent working at a call center (e.g., telesales), or a third-party vendor (e.g., door-to-door sales, mall kiosk, retail sales, direct marketing). The system may validate an agent's right to shop on a given channel. The system may validate an agent's right to make an affiliate sale to a given customer. Validating an agent's right to shop on a given channel or make an affiliate sale to a given customer may include validating a password, code, key, or other unique identifier. Each agent may be assigned an identifier or other authentication credentials.

In step 404, the system may search for a customer profile. The system may search for a sales lead or customer. The system may search for a customer using an address, name, location, phone number, email address, internet protocol (IP) address, geolocator, account number, and/or other identifier. The system may return information about one or more customers matching the search criteria. The system may perform a further search on the search results to filter or reduce the number of results. The system may return zero or more possible matches.

In step 406, the system may select a customer profile. The system may select a customer profile associated with a customer found during the customer search in step 404. The customer profile may indicate whether the selected customer is a current customer, new customer, or a past customer. The customer profile may indicate current services the customer subscribes or has access to. The customer profile may indicate past services the customer previously subscribed to, types of content consumed, goods purchased, etc.

In step 408, the system may present eligible offers. The system may return a list of service and/or product offers the selected customer is eligible for. For example, if the customer lives in a certain geographic area, the customer may be eligible for a promotion available to customers living in that certain geographical area. If the customer subscribes to or has subscribed to a particular service, the customer may be eligible for certain offers different than the offers available to a customer who does not subscribe or has not subscribed to a particular service. For example, a first-time customer may be eligible for certain offers that a current or past customer is not eligible for.

In step 410, the system may process offers in a pre-defined space in a network, such as in a memory that may be compartmentalized into a cart. The system may select an offer from the eligible offers presented in step 408. The system may return a cart from which an agent or customer may make choices.

In step 412, the system may configure offers in a cart. The system may capture offer configuration choices. Offer configuration choices for content service may include, for example, channel packages, video-on-demand options, equipment options (e.g., digital video recorder (DVR)), speed options, etc. Data service options may include speed options (e.g., Internet-access speeds), equipment options, additional service options, etc. Other options may include voice-over-Internet-protocol (VOIP) options, telephone options, etc. The system may return a calculated price total for one or more configurations of choices and options, which may be adjusted in response to the offer configuration choices selected.

In step 414, the system may query available time slots for installation (e.g., initiation) or service. The system may return a list of time slots available for installation or service. The list of time slots available for installation or service may vary depending on the configurations or choices currently in the cart. For example, if a cart has a new service selected, the installation time may take a different amount of time than the time for a repair service. The system may query a database that contains schedules for repair or installation resources (e.g., equipment or professionals) in a region nearby the customer location. The system may receive a list of available times that the user or customer is available (e.g., the customer may provide available times, the customer may link another account to the customer profile (e.g., a calendar of the user, which the system may access to determine available times), the system may detect typical times the customer is at home (e.g., television viewing habits, security system, etc.)). The system may filter the results from the database to only include those results that include times that the repair installation professional is available and that the customer is available.

In step 416, the system may confirm installation options. The system may receive a selection (e.g., from the user) of a time slot to perform the selected service. The system may capture installation choices (e.g., installation time, installation place, persons present for installation, equipment to be installed).

In step 418, the system may assess the financial risk to the company. For example, the system may assess the financial risk of offering the selected offer to the customer. The system may determine what, if any, customer debt, house debt, past due balance, or other obligation may be associated with the customer. For example, a system may prompt a user or customer for additional financial information, query a system database for customer payment history, or otherwise obtain more information on the financial health of the customer.

In step 420, the system may mitigate financial risk. The system may determine whether a deposit is required to proceed with an order. The deposit amount may vary depending on the financial risk of offering a product to a customer. For example, if a customer has a high past-due balance, the system may require a higher deposit to process the selected offer than if the customer does not have a high past-due balance. The system may capture a customer's payment information (e.g., credit card, eCheck) required to pay a deposit, to pay off any balances, etc.

In step 422, the system may validate and review the cart. The system may return a list of all the agent-, user-, or customer-provided choices and data as a review step in the buy-flow process.

In step 424, the system may submit the order. The system may confirm a customer's intent to place an order into the service provider's billing platform. Once the customer confirms the order, the order may be finalized, and be sent on for additional processing.

Figure 5:
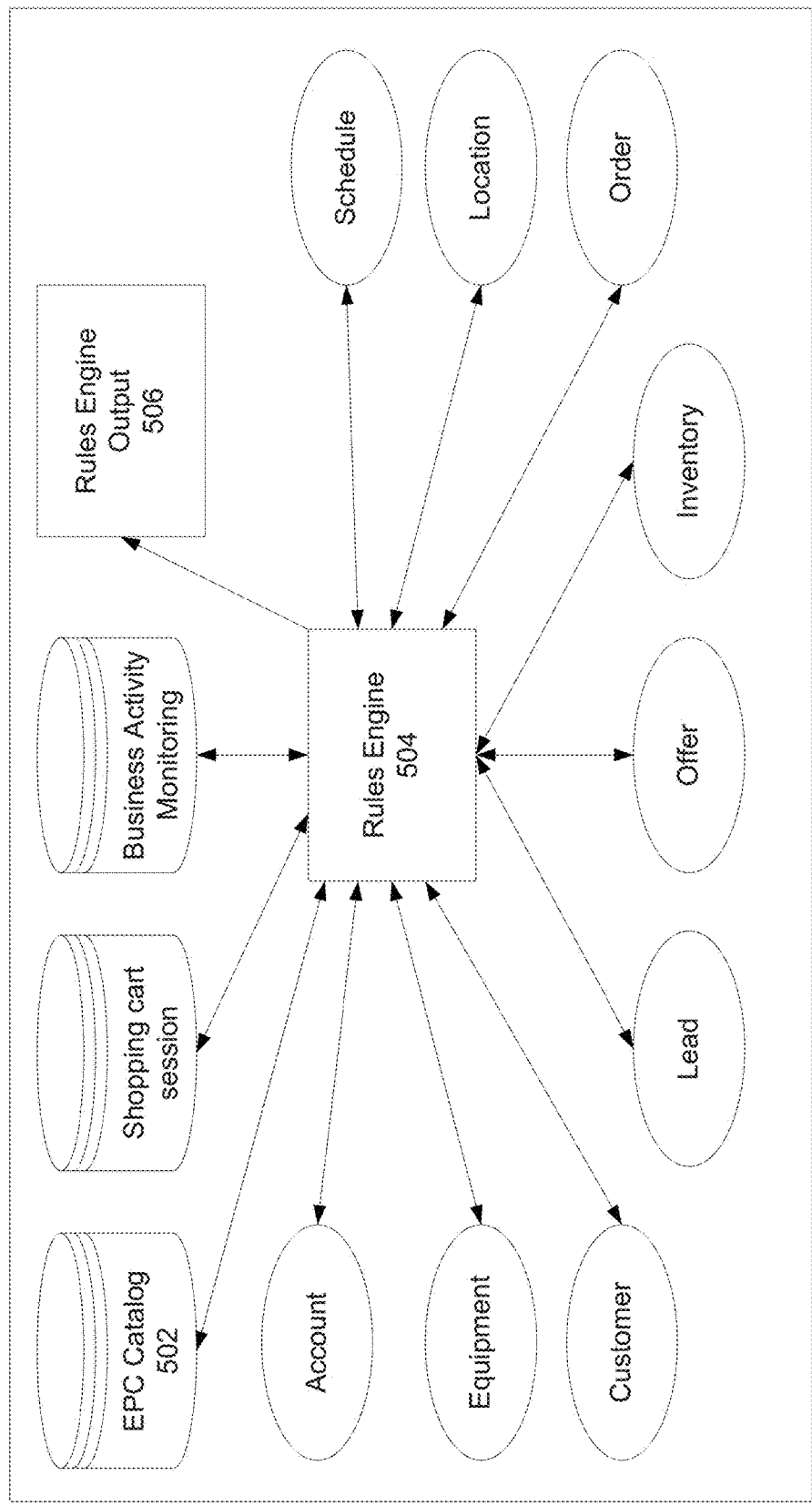
FIG. 5 illustrates an example system for implementing various features described herein.

FIG. 5 shows an illustrative block diagram of an architecture-based set of services for interacting with other systems or services. A system may leverage a services oriented architecture (SOA) based set of services that may abstract the concepts of account, commission, customer, equipment, lead, location, offer, order, inventory, schedule, shopping cart, and as resources. The resources may abstract underlying application systems (e.g., those used in service-provider applications and/or end-user applications).

Leveraging SOA services may allow a system to work with virtually any legacy or next-generation application component. A legacy or next-generation application component may be off-the-shelf software, software as a service, or other software components (e.g., in-house or custom-developed software).

System 500 may include an enterprise product catalog (e.g., EPC 502). The enterprise product catalog may be a single catalog that abstracts offers and products. EPC 502 may optimize abstraction by representing marketing concepts in a manner that is compatible with how a typical billing platform maintains a catalog. EPC 502 may manage concepts such as products, offers, bundles, promotions, prices, and content. EPC 502 may manage how to map marketing abstractions into biller-specific catalogs, including primitive (e.g., code-based billers) and sophisticated (e.g., price plans, offers, etc.). EPC 502 may provide a generic abstraction of underlying billing catalogs in a format familiar to marketing organizations within the service providers. In one embodiment, EPC 502 may be the top manager in a manager-of-manager paradigm.

System 500 may include an automated abstraction process. EPC 502 may be populated with the billing catalog data that EPC 502 may rely on. EPC 502 may be populated via a dual-use translation logic. Billing codes may be reverse translated into EPC products, and EPC offers and products may be forward translated into billing codes. This dynamic two-way translation may allow system 500 to leverage EPC 502 to auto-populate EPC 502 with what is known about billing codes as mapped to products.

Then, using an EPC administrative interface, administrative staff may assign products (including their pricing and billing codes) into offers, allowing marketing to construct "what the service provider sells." Upon completion of a sale process, EPC 502 may forward translate the order into what the underlying billing platform may require to place the order. A benefit of the automated-abstraction process may include an increase in productivity related to revenue reporting processes via the use of EPC 502.

System 500 may include a shopping cart offer construct. One aspect of a business-process platform may include allowing consuming apps to integrate with the platform to complete work. Without consumer applications or users, the platform may not provide as much benefit. The shopping cart offer construct may be embedded in system 500's API stack, and may allow consuming applications to easily consume and manipulate a customer's service, equipment, labor, and feature choice for any line of business. The shopping cart offer structure may support both new and existing, residential and business services customers, in the same manner. More details about a process related to processing shopping cart orders is described below in connection with FIG. 5.

System 500 may include an eligibility rules engine (e.g., rules engine 504). Some service-provider systems may show all possibilities to an Agent and rely on staff to rely on documented methods and procedures, which may place an increased learning burden on staff, increase handle times with customers, and open up the service provider to non-compliance problems. System 500, by contrast, may use eligibility rules engine 504 to avoid such concerns. Eligibility rules engine 504 may be organized by channel and market hierarchy, and support conditional rules based upon expressions evaluating one or more of customer, market, offer, and location attributes. Eligibility rules engine 504 may be in communication with one or more other elements of system 500 (e.g., account, equipment, customer, lead, offer, inventory, order, location, schedule, EPC catalog 502, shopping cart session, business activity monitoring, etc.), and use the information sent to or received from those other elements to determine eligibility. Execution of the rules may reduce the list of available offers for a given customer situation, as well as determining which offers to recommend to the customer. Eligibility rules engine may output results (e.g., eligible offers) to another part of system 500 (e.g., via rules engine output 506).

System 500 may include content management integration. EPC 502 may provide definition of offers and products, and presentation of those elements may be customized. The format of content may be dictated by things like sequence of pages, the form factor of the experience (e.g., device screen size, type), and other channel-specific design goals. Beyond offers and products, this concept may apply to concepts such as lines of business, grouping of product choices, or other catalog-driven constructs. System 500 may simplify this process by providing unique identifiers for each of these constructs, as well as a mechanism to fetch catalog content for any of these identifiers. Content may include (e.g., for a single identifier) things such as name, description, hover-over text, image, audio clip, video clip, etc. Each of these tagged instances of content for given identifiers may have specific content, which may vary by channel or language. The standardized approach may allow additional Lines of Business, Offers, Products, Features, etc., to be added to the catalog and not require client-side application changes to be deployed.

System 500 may include market hierarchy abstraction. A service provider may organize its customer footprint by geographical segments (e.g., international, national, state/province, etc.) for convenient management reasons. These segmentations may be based upon business organizational structures (e.g., east/west). Segmentation may be driven by demarcation of physical plant, by policy, or by franchise regional segmentations. Regardless of the reason, these segments may become large (e.g., 10,000 segments), within which it may become difficult to manage the various data and policy implications that vary by market. To simplify this, system 500 may leverage a simple market hierarchy structure (e.g., national, division, and region), within which data (e.g., catalog offers) and policies (e.g., credit screening rules) may be defined at a national level, and then overridden for sub-markets in the hierarchy on an exception basis (e.g., via a white- or black-list approach). This approach may reduce the human labor and mistakes associated with defining and tracking these variances.

System 500 may perform run-time offer assembly. In some embodiments, a service provider may provide multiple lines of business. System 500 may support the definition of bundles via EPC 502. But rather than require staff to define each bundle, system 500 may support the ability to assemble the bundle at run-time via base components. System 500 may recognize the bundle, its promotions, etc., and assemble the appropriate components into the shopping offer. This may drive catalog reuse. For example, the catalog may include a $10 add-on promotional offer for a given feature. The catalog may also include two bundles, a two-play, and a three-play, with each including the $10 add-on feature. EPC 502 may thus contain three offers, the feature, the two-play bundle, and the three-play bundle. During the shopping experience, system 500 may combine the bundle offers with the appropriate feature offer to create the shopping offer that may be presented to the customer.

System 500 may include offer request-to-publish management. The system may provide tools to allow marketing to request, finance to approve, and staff to configure offers from original request all the way through published and available for sale. Some service providers may certify this process on behalf of Sarbanes-Oxley (SOX) compliance policies, which may include tracking which individuals requested and approved the offer and associated pricing. This process may leverage system 500's run-time assembly mechanism, and catalog mappings to reduce this process to a minimum number of days.

System 500 may include a set of APIs against which applications may be integrated to provide a consistent sales experience across channels. The consuming application may register its affiliate and channel in use, which may assist in ensuring proper authorization and behavior of the platform throughout a customer-interaction session. Some functions may be configured for alternative (e.g., policy-based) behavior based upon the specified affiliate and channel.

System 500 may use process sessions when interacting with applications (e.g., an application used by a shopping channel). System 500 may maintain application state for a sales application via the session construct. Each interaction with a customer, whether manned by an agent or in a self-service manner (e.g., website), may require an initial API call to system 500 to verify one or more of the channel, affiliate, and agent participating in the sales experience with the customer. The initial API call may initiate a process session and a unique session ID. All subsequent application interaction on that customer's session may include that session ID. Application integration may be via simple object access protocol (SOAP) APIs (e.g., those documented by application API consumer guides).

Maintaining a process session may offer several advantages. For example, abandoned sessions may become leads and opportunities, which may be forwarded to a lead management system. Another advantage may include that abandoned session carts may be taken over and continued, when the same customer re-presents herself, even if the customer arrives via an alternate channel (one illustrative flow of this process is described in connection with FIG. 6). Another advantage may include that system 500 may pre-fetch data of interest to a given session, once a specific point in the flow arrives. Another advantage may include that system 500 may alert the affiliate-channel applications via error messaging to indicate which step in the shopping flow the application may revisit. Another advantage may include that system 500 may track all process session activity via business-activity-monitoring strategies.

System 500 may use a cart object within its API responses. The cart may present a standard service, equipment, feature, and labor data structure to a client application. New lines of service, equipment, features, etc., may have a data-driven appearance to the consuming client application. The cart structure may include a content identifier that may be used to fetch tagged HTML content (e.g., highlights, hover-over, description, etc.).

Figure 6:
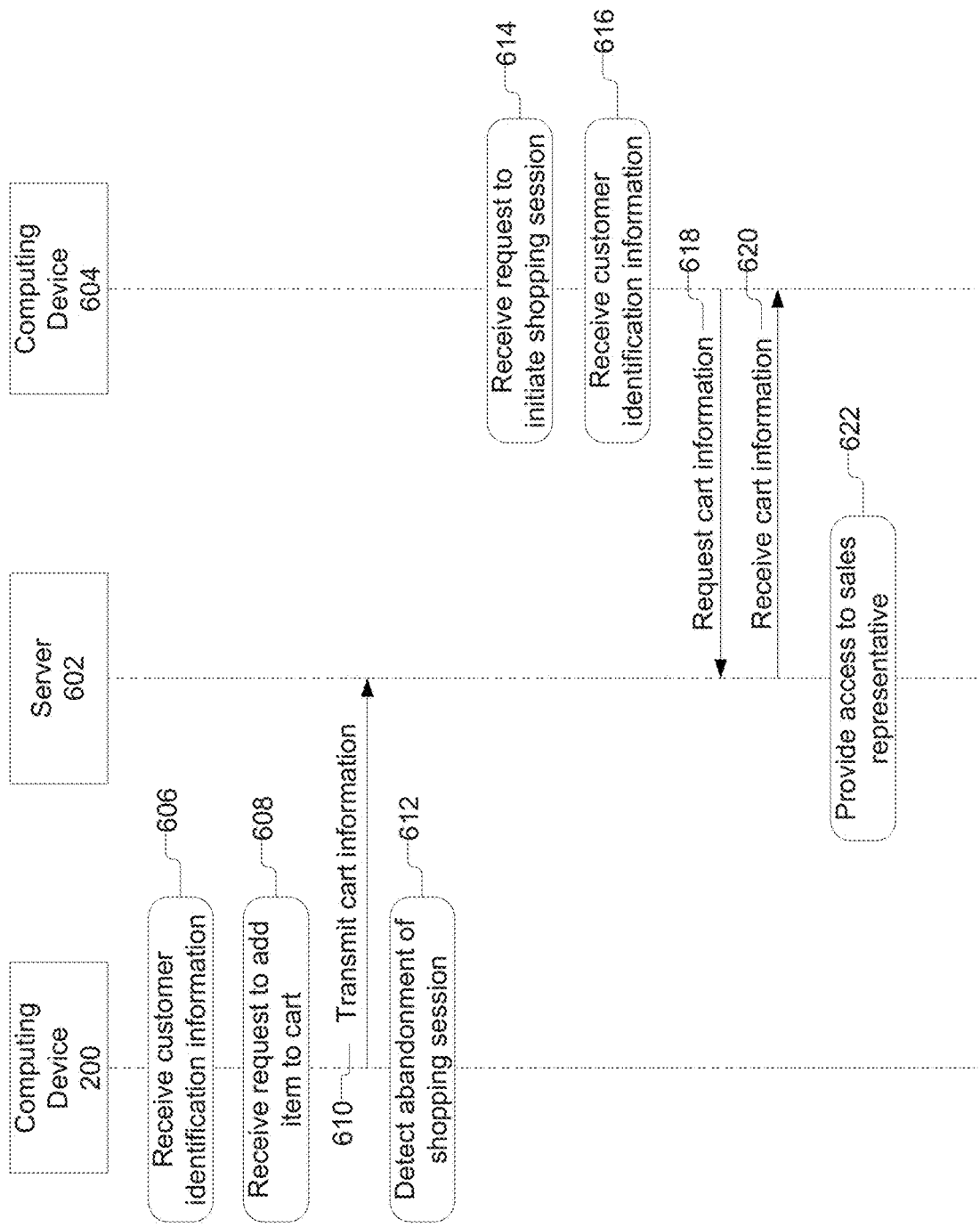
FIG. 6 illustrates an example process flow for implementing various features described herein.

FIG. 6 shows an illustrative flow diagram of a system that shares information about a shopping cart and associated interactions between different sales channels. A system may share information about a shopping cart between different sales channels by, for example, connecting different sales channels through a single front end or sales platform. One embodiment of a system is described in connection with FIG. 3B.

FIG. 6 shows several illustrative devices that may interact with each other. The illustrated devices include computing device 200, server 206, and computing device 604. As described earlier, computing device 200 may be a user device, a device used by an employee or agent of a service provider, or another device. Server 206 may be one or more servers or computing devices associated with one or more service providers. Computing device 604 may be similar to computing device 200, in that computing device 604 may be a user device, a device used by an employee or agent of a service provider, or another device. As one of skill in the art would appreciate, more or fewer devices or servers could be used in a process similar to that described in connection with FIG. 6, which provides one illustrative example of interactions between different devices interacting across sales channels.

In step 606, a computing device (e.g., computing device 200) may receive customer-identification information. For example, a user may login to a user profile, login to an account with a company associated with a shopping cart, login to an account with a company not associated with the shopping cart, provide a name, address, email address, internet protocol (IP) address, phone number, social-security number, or some other piece of identifying information. Computing device 200 may associate the shopping cart with the customer-identification information, and may transmit the customer-identification information to server 602.

In step 608, computing device 200 may receive a request to add an item to the online shopping cart, which may be associated with a shopping session on a shopping channel. For example, a customer may be shopping on a company website, and add a product to a shopping cart. For example, a customer may be shopping for new content service on a service-provider website. The customer may select a service plan on the website, and add the service plan to the shopping cart associated with the website.

Information about a shopping cart may be stored on computing device 200, a device (e.g., server 602) remote from computing device 200, a user device, or another device. For example, information about a shopping cart may be stored in a cookie or other file on computing device 200. Information about a shopping cart may be provided by, stored on (e.g., temporarily stored, stored long term), or otherwise connected to server 602.

In step 610, computing device 200 may transmit cart information to a server 602. For example, computing device 200 may transmit the state of the shopping cart to a server 602. Computing device 200 may transmit the updated state of the shopping cart to server 602 after each change is made. For example, if a user adds an item to the shopping cart, computing device 200 may transmit the user's adding the item to the shopping cart to server 602. If the user removes an item from the shopping cart, computing device 200 may transmit the user's removing the item from the shopping cart to server 602. If the user changes an item in the shopping cart (e.g., quantity of the item), computing device 200 may transmit the user's changing the item in the shopping cart to server 602.

In step 612, computing device 200 may detect abandonment of the shopping session. For example, the customer may close the browser, navigate to a different web page, shut down computing device 200, stop using computing device 200, the shopping cart may time out, etc. Computing device 200 may transmit a notice of abandonment to a computing device (e.g., server 602).

In step 614, computing device 604 may receive a request to initiate a different shopping session from the same user using computing device 200 in the shopping session described in connection with steps 606-610. Alternatively, a different user that may be associated with the same user (e.g., the different user may be the same user's spouse, family member, roommate, etc.) may initiate a different shopping session. The different shopping session may be on the same sales channel or a different sales channel. For example, the shopping session may have been on a website, and the different shopping session may be at a retail location, on a telephone call (e.g., telesales), with a third party (e.g., a third-party vendor), or another sales channel.

Computing device 604 may be associated with the different shopping session. For example, if the different sales channel associated with the different shopping session is telesales, then computing device 604 may be used by a telephone-sales representative discussing the telesales with the customer during the different shopping session. For example, a customer may initially attempt to order or purchase a service or product using a website (e.g., a first shopping session) on computing device 200, and for some reason did not complete the order or purchase (e.g., the customer ran out of time, could not find a desired service, product, or configuration, etc.). The customer may then call the service provider associated with the website, at which time the telephone-sales representative may use computing device 604 to assist the customer over the phone with the different shopping session.

In step 616, computing device 604 may receive customer-identification information. For example, a telephone-sales representative may ask the user for customer-identification information, such as the customer's name, address, phone number, user name, or some other identifying information, or combination of identifying information. In another example, if a customer is using computing device 604 (e.g., a different computing device than computing device 200—for example, computing device 200 may be the customer's laptop, and computing device 604 may be the customer's tablet or smartphone), the different shopping session may be another attempt by the user to use the website of the service provider. In this example, the customer may provide customer-identification information (e.g., login information, user credentials) to the website.

In step 618, computing device 604 may request cart information from server 602. For example, computing device 604 may transmit a message to server 602 that requests the cart information. The message may include customer-identification information, shopping-session identification information (e.g., time, date, place, or other information about the previous shopping session), or other information. The request for cart information may include one or more data calls to one or more APIs associated with the service provider or server 602.

In step 620, computing device 604 may receive cart information from server 602. For example, computing device 604 may receive the cart's contents, information about the previous shopping session (e.g., services, products, configurations, browsing history, or other details about the previous shopping session). Computing device 604 may receive the cart information securely (e.g., a secure connection, a virtual-private network, an application tunnel, the cart information may be encrypted, etc.). The cart information may be provided in response to one or more API data calls made by computing device 604. Server 602 may retrieve some or all of the cart information from one or more other computing devices or servers (e.g., before some or all of the cart information is sent to the computing device 604).

In step 622, server 602 may provide access to the online shopping cart to a sales representative during the different shopping session on the different shopping channel. For example, the sales representative may be associated with (e.g., using) computing device 604, so computing device 604's receiving cart information in step 620 may provide access to a sales representative. For example, if the sales representative is a telephone-sales representative, the telephone-sales representative may see the cart information from the customer's previous sales session (e.g., on a website associated with the service provider), then discuss the different options (e.g., service, product, configurations) available to the customer, to assist the customer to make an informed and satisfactory purchase or service order.

Some embodiments may include filtering of the shopping cart. For example, if a product available on one shopping channel is not available on a different shopping channel, if the system transfers shopping cart information from the one shopping channel to the different shopping channel, the system may filter the cart contents to only include products or services available on the different shopping channel. For example, if a website offers online-only offers, and a customer visits a retail location for the different shopping session (e.g., a representative at the retail location assisting the customer with the different shopping session receives shopping cart information from the customer's earlier sales session on the website), the cart received from the earlier sales session for the different shopping session may not include the same online-only offers. In some embodiments, the system may determine new, different, equivalent, or corresponding offers to include in the cart based on the sales channel type for the different sales channel.

In some embodiments, an employee or representative associated with the service provider may provide feedback to the service provider on behalf of the customer in response to the customer's abandonment of the shopping session and initiation of the different shopping session. For example, if the customer abandoned the shopping session on a website because the website was confusing or difficult to navigate, and the customer completes an order for a service or product over the telephone (e.g., the telephone representative retrieves the shopping cart from the shopping session for use during the different shopping session), the telephone sales-representative may provide feedback to the service provider regarding the customer's experience with the service-provider website.

Figure 7:
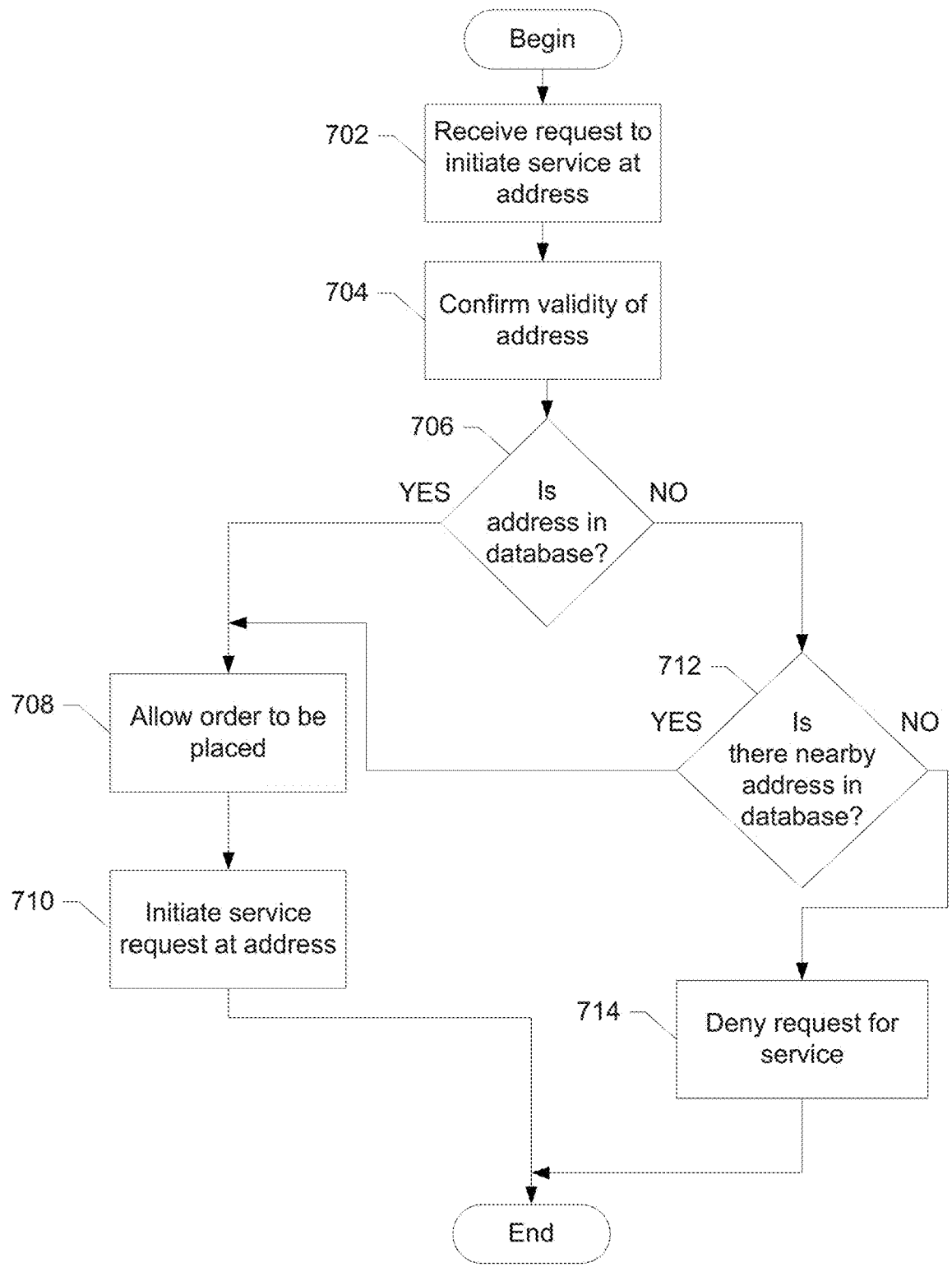
FIG. 7 illustrates an example process flow for implementing various features described herein.

FIG. 7 shows an illustrative flow diagram for the system to receive and process a request for new service when a location such as an address is not known to a provider (e.g., the location is not in the company database).

Some systems (e.g., service providers) may not allow a user to create a new account for receiving service at a particular address if there has not been service at that address in the past, or if that address is not in the company database. For example, a house may be newly constructed, and therefore not in the company database. Alternatively, the house may not be newly constructed, but may never have had service before, and therefore not in the company database.

The system described herein (e.g., in FIG. 3B) may allow a customer to initiate a new service request at a location, even if there has never been service at that location. For example, the system may follow a method similar to that shown in FIG. 7. The method in FIG. 7 may be performed using a different order, and may not require every step.

In step 702, the system may receive a request to initiate service at a location (e.g., an address, global-positioning system (GPS) coordinates, or other location). For example, a user may be using a service-provider website, where the user may be attempting to purchase or setup new service. The user may enter the user's address in the website.

In step 704, the system may confirm the validity of the location (e.g., address). The system may check if the address is correctly entered (e.g., spelling, valid characters). The system may compare the address against a database of known addresses (e.g., company database, county database, phone book listings). If the location is not valid, the system may ask the customer to reenter the address until the address is valid.

In step 706, the system may determine if the location is in a database. The system may determine if the location is in a company database (e.g., a database with addresses that have had service in the past). The company database may include an indication of whether the location may receive service. For example, a location may be inaccessible to connect to the network (e.g., a rural location may be too far from the nearest network hub to connect to the network). A location may be accessible to connect the network, but may not be wired to connect to the network (e.g., there may not be an existing wire going to the building).

If in step 706 the system determines that the location is in the database, the system in step 708 may allow the order for initiating service to be placed. The system may create a new order, and give the customer a confirmation that the order has been placed.

In step 710, the system may initiate a service request at the location (e.g., the address). The service request may result in initiating service at the location, which may include laying wire to the location, installing equipment at the location, activating service, adding the location to a billing system.

If in step 706 the system determines that the location is not in the database, the system may go to step 712. In step 712, the system may determine if there is a nearby location (e.g., address) in the database. For example, the system may search the database for other locations (e.g., addresses) nearby the location. The system may compare the distance from the location to other locations in the database. For example, the system may determine whether the location is within a particular (e.g., predetermined) distance, such as a two-block radius, of another location in the database. If there is a nearby location that has service, bringing service (e.g., laying wire) to the requested location may be possible. Thus, the system may allow a service provider to complete sales for service to a location that may have previously been rejected because the location was not in the company database.

If in step 712 the system determines that there is not a nearby location in the database, the system in step 714 may deny the request to initiate service at the address. For example, the system may determine that there are no nearby locations that receive service, and therefore the service provider may not be able to provide service to that location (e.g., certain parts of Alaska).

Figure 8:
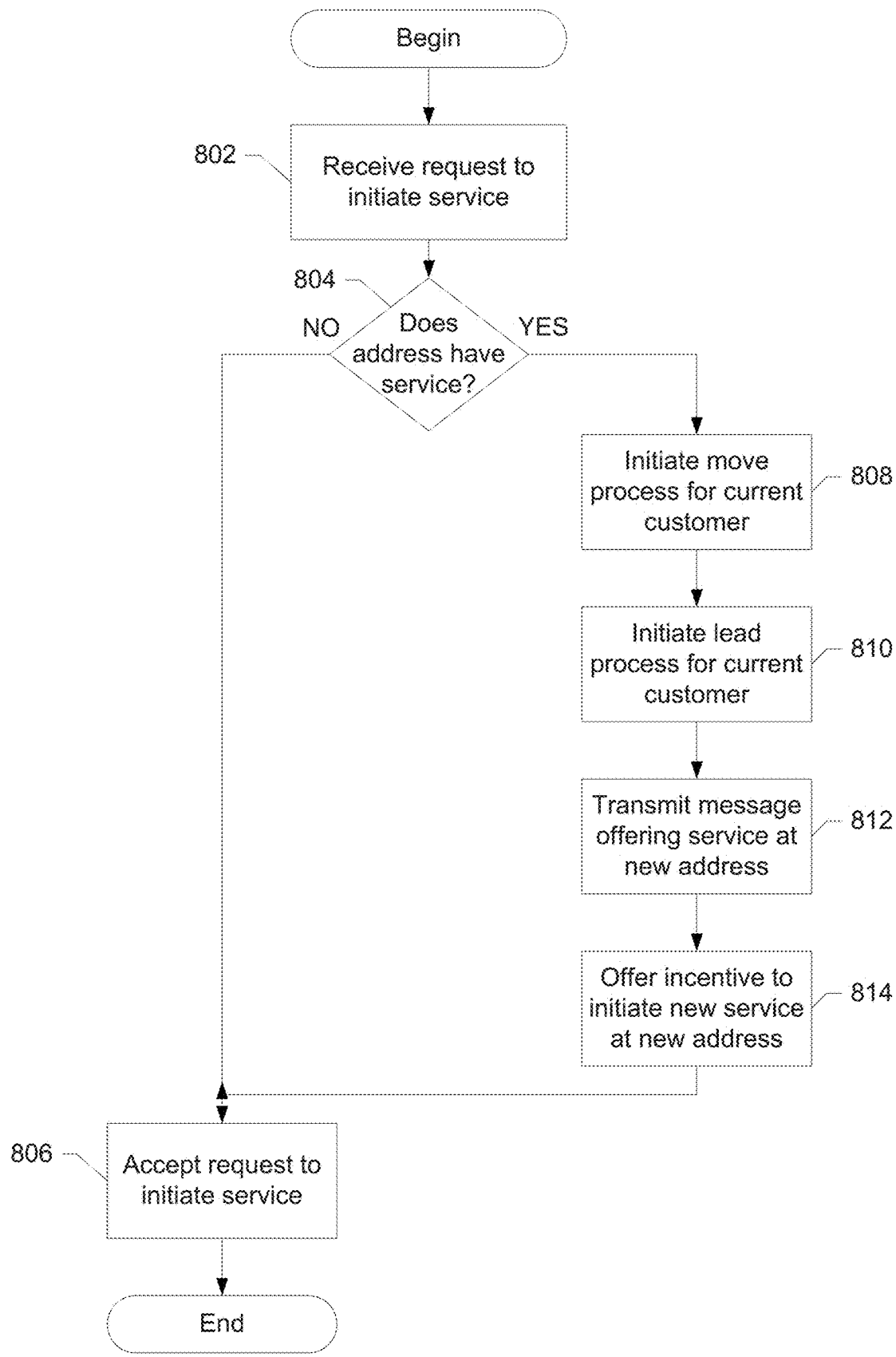
FIG. 8 illustrates an example process flow for implementing various features described herein.

FIG. 8 shows an illustrative flow diagram for the system to receive and process a request for new service when the address already has service.

Some systems (e.g., service providers) may not allow a user to create a new account for receiving service at a particular address if there is already service at that address. Some systems may associate service with an address rather than, for example, a person. Therefore, the address may not be eligible to receive new service if there is already existing service.

For example, if Shannon has a content-provider service, and Ron is buying Shannon's house and moving in (and Shannon moving out), some systems may not allow Ron to initiate a new service request at Shannon's house until Shannon moves out and her service stops. Such a situation may be difficult or frustrating. In another example, several roommates may each have different content preferences, and therefore wish to have their own subscriptions or types of service. But as described above, some systems may only allow an address to be associated with one account, and therefore the roommates may not each be able to have their own subscriptions.

The system described herein (e.g., in FIG. 3B) may allow a customer to initiate a new service request at a location, even if there is already service at that location. For example, if a new customer is moving into a house that already has service, the system may allow the new customer to order service before the person in the house with the existing service moves out.

In step 802, the system may receive a request to initiate service at a location (e.g., an address). The system may determine if the address is valid (e.g., check spelling, street name, etc.). The system may check with one or more databases or other information sources (e.g., county address lists, company database, phone-book listings) to determine if the location is valid.

In step 804, the system may determine whether the location has service. The address may be associated with a location that currently has service. For example, a house may already have service, and a new customer may request to create a new account at that house. Alternatively, the house may not currently have service (e.g., the house is new construction, or the current occupants do not have service).

If in step 804 the system determines that the location does not have service, the system in step 806 may accept the request to initiate service. The system may transmit a confirmation of acceptance of the request to initiate service (e.g., display a confirmation, send a confirmation email, letter, make a confirmation phone call, etc.). The system may initiate service. For example, the system may create a new account for the location, schedule a technician to visit the location to setup service, add the new account to the billing system, create a customer profile associated with the new account, etc.

If in step 804 the system determines that the location currently has service, the system may in step 808 initiate a move process for the current customer at the location. For example, if the requesting customer is initiating service because the requesting customer is moving into the house where the current customer lives, then the existing customer may be moving out to a new address. The system may initiate a transfer process to allow the current customer to move the existing account to the new address.

In step 810, the system may initiate a lead process for the current customer. The current customer may want a different type of service at the new address. For example, if the current customer's existing account is basic cable, the system may initiate a lead process to offer the current customer an enhanced cable package at the new address. The lead process may be responsive to the location the customer is moving to. For example, if the current customer lives in Chicago, the current customer may be a Chicago Cubs baseball fan. If the current customer's new address is in Washington, D.C., the current customer may wish to watch the Chicago Cubs at the new location. Alternatively or additionally, the current customer may also wish to watch the Washington Nationals baseball games at the new address. Therefore, the lead process may include offering a package to the current customer that includes broadcasts of Chicago Cubs and Washington Nationals baseball games.

In step 812, the system may transmit a message to the current customer offering service at the new location the current customer may be moving to. The system may email, call, text, or otherwise transmit a message offering new service to the current customer. As described above in steps 808, 810, and 812, the current customer may be moving to a new address, and may want to have service at the new address. Therefore, the system may initiate a message to reach out to the current customer to find out how best to meet the current customer's needs in the moving process or at the new location.

In step 814, the system may offer an incentive to initiate service at the new address. The system may offer a discount, an enhanced package, a new service plan, or some other incentive to initiate new service at the new location, or to transfer the existing service to the new location. The customer may accept the offer of new service, and the system may process the offer acceptance.

After meeting the needs of the current customer, the system may go to step 806 and, as described above, accept the request to initiate service for the new customer at the existing address. The system may receive the date that the new service is scheduled to begin (e.g., the date that the new customer moves into the existing address). The system may schedule a technician to visit the location on or around the date that the new service is scheduled to begin (e.g., to setup new equipment, install new wires, upgrade or maintain the location, make adjustments necessary for the new service, etc.).

FIG. 9 shows an illustrative system flow diagram for offering customer support. The system may perform forensic diagnostics. Business-activity monitoring may track interactions with the system. Each interaction may require a unique session, denoting which affiliate, channel, application, and applicable agent is interacting with a customer through the system. Every API request and response may be logged in real-time by session, as well as each interaction with underlying resource (e.g., corporate application).

With this infrastructure in place, the system may be used to troubleshoot distressed sales situations (e.g., new customers that cannot identify their address with the service provider's footprint). The support staff that handles these situations may be technical in nature. But if many applications (e.g., different applications used by different shopping channels) have been built against the system platform, the technical support staff may not expect to have access to the particular application (e.g., UI application) to understand how the issue occurred. By leveraging the business-activity monitoring data the system provides, a generic user application may be built by rendering UI pages based upon trolling through the business-activity monitoring data and combining the response of one call to the system API with the request to the next system API in the same session. The UI application may then replay the session for a non-technical support staff. Thus, the system may allow the support staff to replay the customer's interactions with the system before contacting the support staff, allowing the support staff to, in a reduced time, understand what the customer has attempted to that point.

An example system flow of one illustrative embodiment of this process is described below in connection with FIG. 9.

The system may communicate with a number of different sales channels, as described earlier. Some sales channels may communicate with the system through one or more APIs, which may allow the system to track requests or calls made to the API.

In some systems, a customer may be interacting with a sales channel, and have difficulty navigating the sales channel. For example, a company website may include many different options, configurations, services, etc., and therefore may be confusing or difficult to navigate. A customer may access the website to attempt to purchase a product or service, but may become frustrated and stop accessing the website if the website does not appear to easily meet the customer's needs. Therefore, the system may log the interactions with a particular sales channel to assist in meeting the customer's needs. One way to help meet the customer's needs is described in FIG. 9.

FIG. 9 shows an illustrative flow of communications between computing device 200 (e.g., computer, laptop, smartphone, tablet, set-top box), which may be used by a customer, server 902, which may be provided and supported by a service provider, and support device 904, which may be used by a representative or support staff member of the service provider.

In step 906, computing device 200 may transmit interactions with a sales channel to server 902. A sales channel may be any of those described earlier (e.g., telesales, website, retail, third party, etc.), or a different sales channel. For example, a customer may access the website of a service provider. The website of the service provider may receive information from server 902 through a series of API calls and corresponding responses. An API call may include information identifying computing device 200 (e.g., IP address, MAC address, customer profile). Server 902 may in step 908 log interactions received from computing device 200.

In step 910, support device 904 may receive a request for assistance. For example, the customer using computing device 200 may call a customer support phone number, which may be routed to a call center, where a support representative may be using support device 904 (e.g., a computer).

In step 912, support device 904 may request customer information from server 902. For example, the customer may identify herself by providing identifying information (name, address, account number, customer profile, IP address, MAC address, etc.) to the support representative using support device 904. Support device 904 may transmit a request for the customer's information by using the identifying information received from the customer. In step 914, server 902 may transmit the customer's information (e.g., interactions logged in step 908) to support device 904.

In step 916, support device 904 may use the logged interactions received from server 902 to determine how the customer was interacting with the sales channel. For example, support device 904 may replay the interactions on support device 904 (e.g., as a video, a screen simulator, etc.). Replaying the logged interactions may allow the support representative to quickly see what interactions the customer had with the sales channel to quickly identify what the customer was trying to do. For example, if the customer was trying to sign up for new service, the replayed interactions may show the customer clicking on areas of the website related to signing up for new service. The customer may have not been able to complete the order for new service (e.g., address did not work, payment method, service start date, or any number of required data entries may not have worked), the customer may have been unable to decide among several different service options (e.g., the customer called in to talk to a representative about the different options available), or the customer may have not been able to complete the order for some other reason.

In some embodiments, one or more devices in the system (e.g., support device 904) may combine calls or responses from one or more APIs to construct a visual representation of what the customer saw and did when interacting with an application (e.g., the sales channel). For example, a device may combine in a sequence a response from the API associated with the application with a request to a different API. The response may be to one of the plurality of calls initiated by the customer to the API when the customer was interacting with the application. The device may generate for display a visual representation of the application during the time the customer interacted with the application. The visual representation may be based on the sequence. Replaying the interactions by the customer with the application may include displaying the visual representation based on the sequence.

In step 918, the support representative may assist the customer. For example, support device 904 may transmit a message to computing device 200 that provides additional information that allows the customer to complete the order. Support device 904 may send an email that the customer accesses on computing device 200, the email including a link for the customer to directly order the service the customer was seeking to order. The customer may wish to have support device 904 remotely control computing device 200 to assist in troubleshooting on computing device 200. After the customer's needs have been met, support device may disconnect from computing device 200.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   receiving, by a computing device, a request to initiate a service at a requested address and for a first user;
   determining that a database of addresses previously provisioned with the service does not contain the requested address;
   searching the database of addresses previously provisioned with the service for a nearby address within a threshold distance of the requested address;
   determining, by the computing device and based on the searching, that a wired network can be extended to the requested address;
   causing, by the computing device, the wired network to be extended to the requested address; and
   activating, by the computing device, the service at the requested address.

2. The method of claim 1, further comprising:
confirming a validity of the requested address.

3. The method of claim 2, wherein confirming the validity of the requested address comprises:
requesting, from a different computing device, confirmation that the requested address is valid; and
receiving, from the different computing device, confirmation that the requested address is valid.

4. The method of claim 1, further comprising:
adding the requested address to the database of addresses previously provisioned with the service.

5. The method of claim 4, further comprising:
receiving a confirmation that the service was successfully provided to the requested address,
wherein the adding the requested address to the database is performed after receiving the confirmation that the service was successfully provided to the requested address.

6. The method of claim 1, further comprising:
receiving a second request to initiate a second service at a second requested address;
determining that the second requested address is not valid; and
after determining that the second requested address is not valid, requesting entry of a valid address.

7. The method of claim 1, wherein the database of addresses previously provisioned with the service comprises addresses of current and past recipients of the service.

8. The method of claim 7, wherein the requested address has never been a recipient of the service.

9. The method of claim 6, further comprising:
denying the second request to initiate the second service at the second requested address after determining, based on searching the database of addresses previously provisioned with the service for a second nearby address within the threshold distance of the second requested address, that the second requested address cannot be connected, via the wired network, to a network hub.

10. The method of claim 1, wherein receiving, by the computing device, the request to initiate the service at the requested address comprises receiving the request via a website associated with a provider of the service.

11. The method of claim 2, wherein confirming the validity of the requested address comprises comparing the requested address against a database of known addresses, the database of known addresses being different from the database of addresses that were previously provisioned with the service.

12. The method of claim 6, wherein determining that the second requested address is not valid comprises:
determining that the second requested address is not in a database of known addresses.

13. A method comprising:
receiving, by a computing device, a request to initiate a service at a requested address and for a first user;
determining, by the computing device, that a database of addresses previously provisioned with the service does not contain the requested address;
after determining that the database of addresses previously provisioned with the service does not contain the requested address:
searching the database of addresses previously provisioned with the service for a nearby address within a threshold distance of the requested address;
determining, based on the searching, that a wired communication link of a network for delivering the service can be extended to reach the requested address;
initiating a service request to provide the service to the requested address after determining that the wired communication link can be extended to reach the requested address; and
after determining that the wired communication link has been extended to the requested address, causing provision of the service, via the wired communication link, at the requested address.

14. The method of claim 13, further comprising:
comparing the requested address to the nearby address to determine a distance between the requested address and the nearby address.

15. A method comprising:
receiving, by a computing device, a request to initiate a service at a requested address and for a first user, the service being provided by a service provider;
determining, by the computing device, that a database of addresses previously provisioned with the service does not contain the requested address;
after determining that the database of addresses previously provisioned with the service does not contain the requested address:
searching the database of addresses previously provisioned with the service for a nearby address within a threshold distance of the requested address;
determining, based on the searching, that the requested address is within the threshold distance of a wired portion of a network for delivering the service;
initiating a service request to provide the service to the requested address based on determining that the requested address is within the threshold distance of the wired portion of the network for delivering the service;
after determining that the network has been extended to the requested address, causing provision of the service, via the network, at the requested address; and
initiating a transfer of service process for a second user associated with the requested address, wherein the transfer of service process causes a provision of service to the second user at a new address.

16. The method of claim 15, further comprising:
receiving a second request to initiate the service at a second requested address; and
after determining that the database of addresses previously provisioned with the service contains the second requested address:
determining whether an existing service is already being provided to the second requested address; and
after determining that the existing service is already being provided to the second requested address:
initiating a request to transfer the existing service to a different address; and
initiating a process to provide the service at the second requested address.

17. The method of claim 16, further comprising:
generating a notification to a user of the existing service, the notification comprising information about the request to transfer the existing service to the different address; and
receiving a confirmation of the request to transfer the existing service to the different address.

18. The method of claim 17, further comprising:
initiating a process to provide the service at the requested address after receiving the confirmation of the request to transfer the existing service to the different address.

19. The method of claim 15, further comprising:
receiving a second request to initiate the service at a second requested address; and
after determining that the database of addresses previously provisioned with the service contains the second requested address:
  determining whether an existing service is already being provided to the second requested address; and
  after determining that the existing service is already being provided to the second requested address, determining, based on a response to a prompt on a website of the service provider, whether to provide the service at the second requested address in addition to the existing service or instead of the existing service.

\* \* \* \* \*

UNITED STATES PATENT AND TRADEMARK OFFICE
CERTIFICATE OF CORRECTION

PATENT NO. : 10,726,471 B2
APPLICATION NO. : 14/494023
DATED : July 28, 2020
INVENTOR(S) : Avgiris et al.

Page 1 of 1

It is certified that error appears in the above-identified patent and that said Letters Patent is hereby corrected as shown below:

In the Specification

Column 4, Detailed Description, Line 14:
Delete "HTMLS," and insert --HTML5,-- therefor Signed and Sealed this
Twenty-seventh Day of December, 2022

Katherine Kelly Vidal
*Director of the United States Patent and Trademark Office*